May 17, 1960 — I. SWERLICK ET AL — 2,936,492
METHOD OF CASTING CRYSTALLINE POLYMER FILM
Filed Oct. 4, 1956
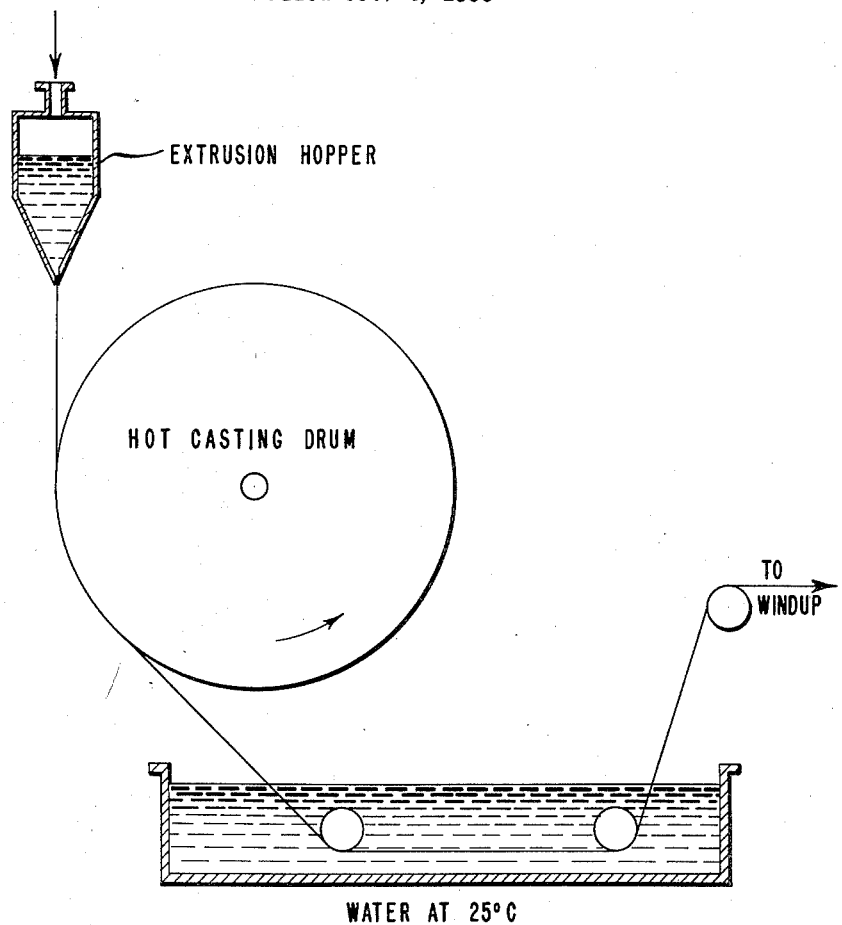
INVENTORS
FRANK P. GAY
ISADORE SWERLICK
BY *A. Ralph Snyder*
ATTORNEY

2,936,492

METHOD OF CASTING CRYSTALLINE POLYMER FILM

Isadore Swerlick, Tonawanda, N.Y., and Frank P. Gay, Wilmington, Del., assignors to E. I. du Pont de Nemours and Company, Wilmington, Del., a corporation of Delaware Application October 4, 1956, Serial No. 614,028

5 Claims. (Cl. 18—57)

This invention relates to forming crystalline films from a melt, and more particularly, to a process of melt-casting normally crystalline, organic polymer film, such as polyoxymethylene film, which tends to shrink appreciably during its conversion from a melt to a completely solidified self-supporting film.

The invention will be particularly described with reference to the formation of a substantially-flat, wrinkle-free polyoxymethylene film which is fully described and defined in U.S. application Serial No. 408,172, now U.S. Patent No. 2,768,994, filed February 4, 1954, in the name of R. N. McDonald. Poloxymethylene films are highly crystalline in nature; and depending upon the manner in which they are formed, the degree of crystallinity may range from 50–72%. The density of the theoretically complete crystalline polymer has been determined as 1.506 grams/cc. while the completely amorphous polymer has a density determined at 1.277 grams/cc. The melting point, referred to herein as the optical melting point, i.e., the lowest temperature at which the polymer appears to be totally amorphous when viewed with the polarized light is within the range from 183° C.–185° C. The optical melting point is determined by increasing the temperature of the solid polymer until it melts.

When a molten film of polyoxymethylene is cooled to room temperature, crystallization with attendant shrinkage (about 10%–20%) inevitably takes place. Slow cooling of the molten film results in a structure having a high ultimate degree of crystallinity and relatively large spherulites (a spherical group of minute radiating crystals). However, when formed under such conditions, the resulting film is relatively brittle, and therefore is difficult to handle in subsequent operations, such as in operations designed to orient the film. On the other hand, rapid quenching results in a film having a lower degree of crystallinity and smaller spherulites and, consequently, results in a film which is considerably tougher than one formed by the slow cooling process, and which is more amenable to further processing.

Rapid quenching of crystallizable polymers in film form, in order to eliminate the formation of crystals (form an amorphous film) or reduce the ultimate degree of crystallinity (in the case of films which cannot be solidified in amorphous form), is well known in the art of film processing. Such rapid quenching techniques are those involving direct extrusion of a molten film into cool liquids, such as water, or extrusion directly onto a cold metal surface, such as a quench drum. Attempts to quench polyoxymethylene film by either of these techniques have consistently resulted in forming a curled film or one which was not flat. Such a film is obviously difficult to handle in wind-up apparatus or in subsequent processing such as orientation. The reason for the formation of a curled film, in the case of quenching a polyoxymethylene film, is believed to be due to the inherent tendency of the film to shrink appreciably during crystallization. If the film is not cooled uniformly, the film will shrink to a greater degree in some areas than in others, and therefore, the film will tend to curl. Such conditions apparently prevail in quenching the film by direct extrusion of the melt into a quench bath or onto a cold metal surface to which the polyoxymethylene film does not stick during its cooling and shrinking.

The problem, therefore, has been to quench the film from a molten condition while restricting shrinkage in the lengthwise and widthwise directions. One way to accomplish this is disclosed in an article by B. H. Maddock "Quenched Fluorothene Film" (Modern Plastics, February 1953, page 116) wherein a molten film having generally the same shrinkage characteristic as polyoxymethylene film is cast directly upon a relatively cool quenching drum, and a snubbing roll is employed to press the film against the cool drum surface and keep it flat.

An object of this invention is to provide a process wherein molten polyoxymethylene film and the like normally crystalline, organic polymer film having an inherent tendency to crystallize and to shrink appreciably on cooling, is cast and rapidly quenched under conditions effective to restrict shrinkage of the film during cooling. Another object is to melt cast poloxymethylene to form a substantially flat, wrinkle-free, tough film amenable to subsequent orientation operations. The foregoing and related objects will more clearly appear hereinafter.

The above objects are realized by the present invention which, briefly stated, comprises extruding a film of molten, normally crystalline, organic polymer, e.g., poloxymethylene, onto a moving metal casting surface maintained at a temperature effective to cool the molten film to a temperature below the optical freezing point[1] of the polymer (about 163° C.–164° C. for polyoxymethylene), the temperature of said casting surface being sufficiently high to cause said molten film to stick (adhere) to said casting surface upon initial contact, and thereafter quenching said film at a lower temperature to complete solidification of said film.

The present invention resides in the discovery that if the molten, normally crystalline organic polymer film is cast on a metal casting surface maintained within a relatively critical temperature range, as defined above, the film adheres to the casting surface, upon initial contact, with a force greater than the lateral, or longitudinal shrinkage forces so that the shrinkage taking place during solidification and crystallization is in the thickness direction, thereby preventing wrinkling or curling. After solidification of the film has been initiated upon the hot casting surface by cooling the film below its optical freezing point, the film no longer adheres to the metal casting surface, and at this point, it is readily drawn off the casting surface and quenched further by other means. When the film has been cooled to below its optical freezing point, it is adequately stiff or form-stable to maintain itself in a flat condition during subsequent quenching in a cold liquid bath or other conventional quenching means. During further quenching, crystallization takes place without film distortion, and the formed film is significantly tougher than one which was permitted to crystallize completely at the temperature of the hot casting surface. If the casting surface is maintained above that sufficient to cool the film to a temperature below its optical freezing point, the film will adhere too strongly thereto and stripping will be inhibited or prevented. If, on the other hand, the casting surface is maintained at a temperature too low to cause strong adhesion or sticking between the molten film and the casting surface upon initial contact, the film will not be cooled uniformly; it

[1] When the polymer is in completely amorphous form (completely melted), solidification will not begin until the film is cooled to its optical freezing point, and this is the highest temperature at which the crystalline structure begins to form (as observed with a polarized light microscope).

will shrink in the plane of the film, and fall off the casting surface when a conventional cylindrical casting drum is used.

In the casting of polyoxymethylene film, the film is preferably cast upon a metal surface maintained at a temperature such that the actual film temperature is maintained within the critical range hereinabove specified, and within a range where the rate of crystallization and spherulite growth is at a substantial minimum. That is, the film temperature should be maintained above the range from about 150° C. and below its optical freezing point, which is about 163°–164° C. for polyoxymethylene. To maintain the film itself within this temperature range, the casting surface may be at a temperature somewhat lower due to the fact that the film is in contact with the casting surface for only a short duration. In general, the casting surface may be maintained at a temperature as low as 135° C.–140° C. On the other hand, the actual temperature at which the surface may be maintained will depend to a considerable degree upon the thickness of the film being cast and upon the rate of casting. With regard to the thickness of the films being cast, the thinner the film (other conditions being equal), the higher the temperature of the casting surface. On the other hand, with regard to casting rates (linear movement of the film), the higher the casting rate (other conditions being equal), the lower the temperature of the casting surface. The important factor is that the film must be cooled to its optical freezing point, otherwise it strongly adheres to the metal casting surface to the extent that it cannot be stripped.

In the preferred embodiment of our process the molten polymer is extruded in film form onto a casting surface of metal, such as chromium plate, stainless steel or aluminum, and the casting surface is in the form of a cylindrical drum which rotates at the same rate or at a higher rate than that at which the film is extruded onto the casting surface through the lips of an extrusion die.

In carrying out the process of the present invention, the final step is one of conducting the film into an atmosphere which rapidly cools the film to room temperature or below. It is preferred that film be conveyed into a water quench bath wherein the bath is maintained at a temperature near room temperature or below.

The accompanying drawing is a diagrammatic illustration of a preferred arrangement of apparatus for carrying out the process. Referring to the drawing, molten normally crystalline, organic polymer, e.g., polyoxymethylene, in film form F, is extruded from the lips of an extrusion hopper 1 into contact with the surface of a cylindrical hot-casting drum 2 maintained by any convenient conventional expedient, e.g., steam, at a temperature below the optical freezing point of the film. The molten film sticks tenaciously to the hot drum at the point of first contact and this adhesion gradually decreases until the film is cooled below its optical freezing point at which time there is negligible adhesion between film and metal drum. Solidification of the film is initiated on the drum to the point where the film is self-supporting. The resulting partially solidified film is continuously stripped from the drum and is then conducted into a quench bath 3, preferably maintained at room temperature or below. After quenching, the film is fully solidified and is ready for winding up or for further handling, such as drawing and/or rolling to effect orientation, etc.

The polyoxymethylene films with which the present invention is particularly concerned are those described and claimed in the aforementioned United States application Serial No. 408,172. These films are derived from polyoxymethylenes of relatively high molecular weight, e.g., number average molecular weight from 45,000–75,000 and above. In the preferred form, for preparing films of high toughness and impact strength, polyoxymethylenes having molecular weights in the upper portions of the aforementioned ranges are preferred.

The following specific examples of preferred embodiments further illustrate the principles and practice of this invention:

Example 1

Polyoxymethylene of the type described and claimed in United States application Serial No. 408,172 was injected in to the barrel of a ram extruder in powdered form, the barrel temperature being 220° C. and lips of the extrusion die (slot-shaped orifice) being 240° C. The polyoxymethylene had an inherent viscosity of 1.33 and a melt viscosity of 13,600 poises. The polymer was heated for about 5 minutes under a stream of nitrogen, and thereafter all gases were evacuated from the barrel. The molten polymer was extruded through a slot-shaped die having a width of 6" and a lip opening of 0.014". The opening of the extrusion die was about 1" from the surface of a rotating, stainless steel casting drum, the surface of which was maintained at a temperature of about 141° C. The molten film was extruded at a rate of about five feet per minute to provide some drawing of the molten film from the extrusion die. The film adhered uniformly to the surface of the casting drum, and the film was in contact with the drum for about 90° of its peripheral surface. The film was then continuously stripped from the casting surface and passed through a 6" air gap into an aqueous solution containing 1% of polyvinyl alcohol, and thereafter the film was wound up. The quench bath was at a temperature of about 10° C. The arrangement of apparatus was similar to that shown in the accompanying drawing, and the film was extruded tangentially onto the surface of the drum to avoid trapping air under the film. The film was substantially flat and free of wrinkles. The final film was 0.005" in thickness. For purposes of comparison, the molten polymer was extruded under the conditions above-described except that the molten film was extruded directly into an aqueous quench bath (without first being cast onto a hot casting surface). The resulting quenched film was badly curled and wrinkled.

Example 2

Polyoxymethylene of the same type described in Example 1 was extruded into film form under the same conditions described in Example 1 except that the casting drum was maintained at a temperature of 149° C. Under the prevailing conditions, this casting drum temperature was too high to obtain sufficient solidification of the molten film, and the film adhered so tenaciously to the casting drum that it was not possible to strip the film from the drum for subsequent quenching in the aqueous bath.

Example 3

Polyoxymethylene of the type employed in Example 1 was extruded at a temperature of about 200° C. through the lips of an extrusion die (slot-shaped orifice) having an opening of 0.009". The molten polymer in film form was extruded tangentially onto a rotating drum (and remained in contact with the drum for about 90° of the peripheral surface) having a surface maintained at 148° C. The linear rate of extrusion was about 3 feet/minute, and the drum was rotating at a speed of about 2.5 feet/minute. The film was partially solidified upon the hot drum and thereafter conducted into a water bath at room temperature in accordance with the general arrangement shown in Figure 1. The film adhered to the surface of the casting drum under the conditions specified, and was readily stripped therefrom as it passed into the quench bath. The quenched film was 0.010" in thickness. Under the above conditions the temperature of the quench drum was lowered to 145° C., and the film did not adhere well and tended to fall off the drum. These were unsatisfactory conditions. On the other hand, the quench drum thereafter was raised to a temperature above 148° C., in the neighborhood of about 150° C.-152° C. Under these conditions the drum was too hot and the film stuck to the quench drum to such an extent that it could not be readily stripped.

It should be emphasized, as illustrated in the foregoing examples, that the actual temperature of the quench drum will vary with the conditions of extrusion, these conditions including thickness of the molten film, rate of extrusion, rate of rotation of the quench drum, and the temperature of the molten film.

Although the process of the present invention is described hereinabove specifically with respect to forming polyoxymethylene film, it is to be understood that the present process is applicable to forming films from molten thermoplastic polymers generally and particularly from molten polymers which are normally crystalline when solidified from a melt and which shrink appreciably during this transition. Hence, this process may be applied to forming films from relatively high-density, linear, polymethylenes, polyethylenes, and other linear hydrocarbon polymers such as polypropylene.

The process of the present invention provides for forming substantially flat, wrinkle-free polyoxymethylene and like polymer film which may be readily wound up or handled in subsequent orientation operations. The process further provides for controlling the rate of crystallization and spherulite growth in the film during the casting and quenching steps.

We claim:

1. A process for forming flat film which comprises casting onto a casting surface a molten film of a normally crystalline organic polymer selected from the group consisting of polyoxymethylene, polymethylene, polyethylene and polypropylene, said surface maintained at a temperature below the optical freezing point of said polymer, said temperature being sufficiently high to cause said film to adhere to said surface upon initial contact and prevent substantial shrinkage but sufficiently low to cool the film to a temperature below the optical freezing point and to initiate solidification on said surface; removing the partially solidified film from said surface when said film is self-supporting; and thereafter quenching said film at a lower temperature to complete solidification of said film.

2. The process of claim 1 wherein the polymer is polyoxymethylene.

3. The process of claim 1 wherein the film is quenched in an aqueous bath.

4. A process for forming flat film of polyoxymethylene which comprises casting a molten film of polyoxymethylene onto a moving metal casting surface maintained at a temperature effective to cool the molten film to a temperature within the range of from about 150° to about 163–164° C., whereby to partially solidify said film, the temperature of said casting surface being sufficiently high to cause said molten film to stick to said casting surface upon initial contact, removing said partially solidified film from said casting surface and thereafter quenching said film at a lower temperature to complete solidification thereof.

5. A process for forming flat film of polyoxymethylene which comprises extruding molten polyoxymethylene film onto the surface of a revolving cylindrical metal casting drum maintained at a temperature effective to cool the molten film to a temperature within the range of about 150° to about 163–164° C., whereby to partially solidify said film, the temperature of said surface being sufficiently high to cause the molten film to stick to said surface upon initial contact, removing said partially solidified film from said surface, and thereafter quenching said film at a lower temperature in an aqueous quenching bath whereby to complete solidification thereof.

References Cited in the file of this patent

UNITED STATES PATENTS

| Number | Name | Date |
|---|---|---|
| 2,289,774 | Groves | July 14, 1942 |
| 2,276,305 | Hershberger | Nov. 17, 1942 |
| 2,364,435 | Foster et al. | Dec. 5, 1944 |
| 2,405,977 | Peters | Aug. 20, 1946 |
| 2,451,597 | Wheeler | Oct. 19, 1948 |
| 2,551,966 | Pierce | May 8, 1951 |
| 2,768,994 | MacDonald | Oct. 30, 1956 |